(12) United States Patent
Pedersen

(10) Patent No.: US 6,842,512 B2
(45) Date of Patent: Jan. 11, 2005

(54) SYSTEMS AND METHODS FOR MANAGING ELECTRONIC COMMUNICATIONS

(75) Inventor: Elin Rønby Pedersen, Redwood City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 441 days.

(21) Appl. No.: 09/794,102

(22) Filed: Feb. 28, 2001

(65) Prior Publication Data

US 2002/0118807 A1 Aug. 29, 2002

Related U.S. Application Data

(60) Provisional application No. 60/247,990, filed on Nov. 14, 2000.

(51) Int. Cl.[7] .................. H04M 1/56; H04M 15/06; H04M 11/00; H04M 3/42
(52) U.S. Cl. ............... 379/142.01; 379/142.06; 379/210.01; 379/214.01; 379/88.17
(58) Field of Search ............... 379/142.01, 142.04, 379/142.05, 142.06, 142.07, 201.01, 201.06, 201.1, 207.15, 210.01, 211.02, 213.01, 214.01, 67.1, 70, 71, 88.02, 88.04, 88.11, 88.17, 88.18, 88.19; 709/102, 313, 315, 318

(56) References Cited

U.S. PATENT DOCUMENTS

| | | | | |
|---|---|---|---|---|
| 4,939,772 A | * | 7/1990 | Goto | 379/100.16 |
| 5,434,908 A | * | 7/1995 | Klein | 379/88.23 |
| 5,768,347 A | * | 6/1998 | Beyda | 379/67.1 |
| 5,903,723 A | * | 5/1999 | Beck et al. | 709/200 |
| 5,963,626 A | * | 10/1999 | Nabkel | 379/142.01 |
| 6,041,103 A | * | 3/2000 | La Porta et al. | 379/67.1 |
| 6,160,877 A | * | 12/2000 | Tatchell et al. | 379/197 |
| 6,373,817 B1 | * | 4/2002 | Kung et al. | 370/217 |
| 6,383,078 B1 | * | 5/2002 | Yacenda | 463/41 |
| 6,438,216 B1 | * | 8/2002 | Aktas | 379/88.01 |
| 6,580,787 B1 | * | 6/2003 | Akhteruzzaman et al. | 379/88.22 |

OTHER PUBLICATIONS

Sue Mosher, MS Outlook 2000 E-mail and Fax Guide, Digital Press, chapter 21.*

* cited by examiner

Primary Examiner—Quoc D Tran
(74) Attorney, Agent, or Firm—Oliff & Berridge, PLC

(57) ABSTRACT

An interaction manager system and method are provided to aid a caller in communicating with a callee. An interaction space is provided to a caller's communication device. This interaction space can include visibility information that informs the caller about the status of the callee, accessibility information that provides the caller with a list of communication channels available to the caller, and continuity information that includes information and action facilitation data that reflect the ongoing interaction between the caller and the callee.

28 Claims, 6 Drawing Sheets

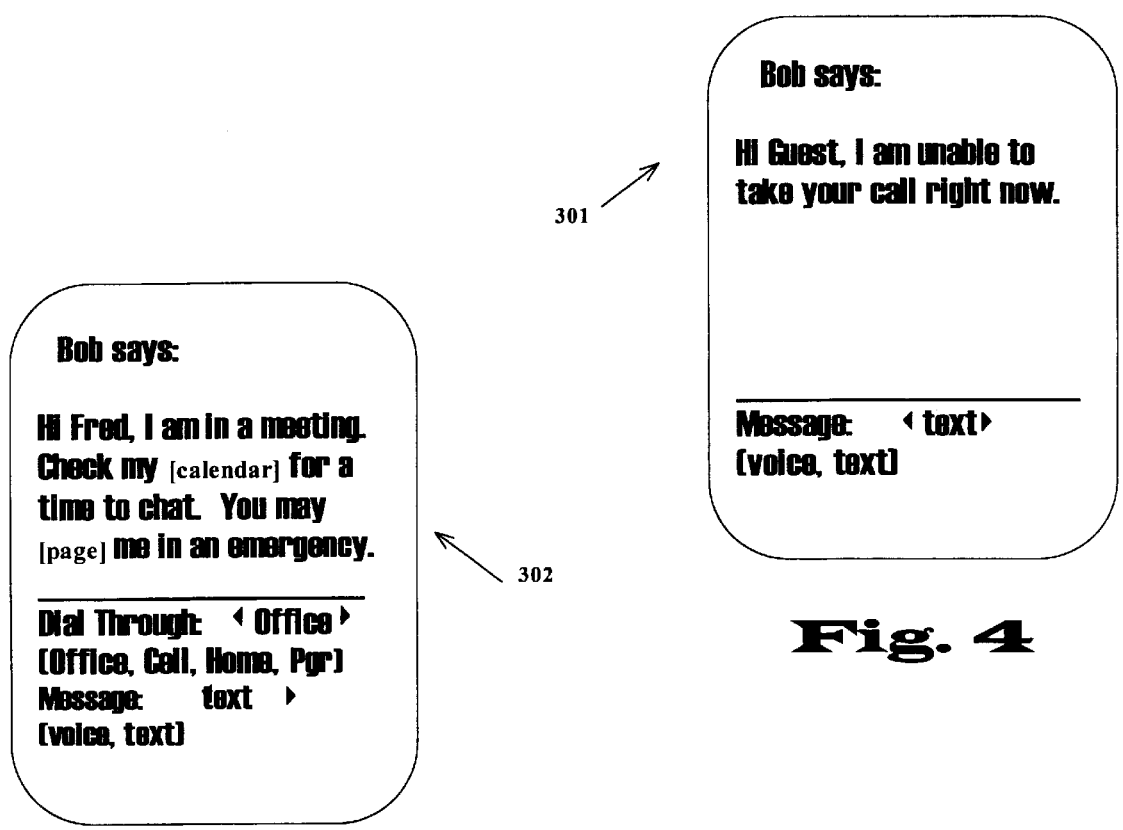

SYSTEMS AND METHODS FOR MANAGING ELECTRONIC COMMUNICATIONS

CROSS-REFERENCE TO RELATED APPLICATION

This application is related to U.S. Provisional application Ser. No. 60/247,990, filed Nov. 14, 2000 from which priority is claimed.

BACKGROUND OF THE INVENTION

1. Field of Invention

This invention relates to managing electronic communications.

2. Description of Related Art

The percentage of telephone calls that are successfully completed in a first try is very low. Frequently, a caller will try several different communication channels, such as an office phone, a home phone, and a cell phone, to connect with another person. Moreover, people often go through several rounds of leaving each other voice mail messages before linking up or getting the matter resolved in other ways.

There are several possible explanations for why interaction is so difficult. First, a telephone call is often handled in isolation. Typically, each call represents a new attempt by the caller to reach the callee. If an individual is not available on a first attempt, a caller may leave a voice mail message or a pager message. A callee may wish to provide important information to a particular caller, but may not wish to provide that information to anyone who happens to call, such a telemarketer. Thus, the caller is often only left with the standard message of a voice mail system or the even less informative pager option.

Likewise, when the callee attempts to return the telephone call of the caller, the communication steps are repeated and may be similarly unsuccessful and inefficient. In addition, conventional technology tends to increase the likelihood that a caller will not answer a telephone call. Because of the invasiveness of existing communication technology, people set up barriers to avoid being interrupted. As a result, interaction can be very difficult to accomplish.

SUMMARY OF THE INVENTION

This invention provides various methods and systems for managing electronic communications.

In various exemplary embodiments of the systems and methods according to this invention, an interaction manager can provide a personalized response message to a caller useful for advancing or completing an interaction with a callee. For example, if the caller is a friend of the callee, the caller might be provided with a specific message regarding, for example, the date and time that the callee is expected to arrive home from a trip. Furthermore, the caller might be provided with information/the opportunity for connecting with the callee's pager and/or home telephone. On the other hand, if the caller is not recognized by the interaction manager, for example, the interaction manager might only provide a generic response message to the effect that the callee is currently unavailable.

The interaction manager can determine the personalized response message at least in part based on the relation between the caller and the callee and the current status of the callee. The relation information available to the interaction manager can include lists of the callee's friends, family, business associates, etc., for example. Status information can be determined using explicit input from the callee, sensor data obtained from the caller's environment, the caller's schedule information, and the caller's interaction history information, for example.

The personalized response message can be displayed or otherwise presented to the caller's communication device as an interaction space. This interaction space can include visibility information to inform the caller about the status of the callee, accessibility information to provide the caller with a list of communication channels available to the caller, and continuity information that includes information and action facilitation data that reflect the ongoing interaction between the caller and the callee.

In addition, the interaction manager can determine whether the caller's communication device is capable of utilizing a particular type of communication. For example, the interaction manager can determine whether the caller's communication device can display and use hypertext links. If the interaction manager determines that the caller's communication device cannot display information in one mode, it can provide this information in another mode. For example, if the caller's communication device cannot use hypertext links, this information can be provided in a text or an audio format.

Because communication to the callee is made through the interaction manager, the callee need only provide callers with a single number or address associated with the callee's interaction manager. Thus, the callee's interaction manager can act as a portal for all electronic communication with the callee.

These and other features and advantages of this invention are described in, or are apparent from, the following detailed description of various embodiments of the systems and methods according to this invention.

BRIEF DESCRIPTION OF THE DRAWINGS

Various exemplary embodiments of this invention are described in detail with reference to the following figures, where like numerals reference like elements, and wherein:

FIGS. 4 and 5 show two exemplary communication devices illustrating the use of interaction spaces according to this invention;

DETAILED DESCRIPTION OF PREFERRED EMBODIMENTS

Frequently, people will go through several rounds of leaving each other voice mail messages, e-mail messages, pager messages, and the like, but still fail to connect or otherwise interact with each other. However, by providing a callee with an interaction manager, a caller attempting to reach the callee can instead interact with the interaction manager to obtain various pieces of information useful for advancing or completing the interaction.

Figure 1:
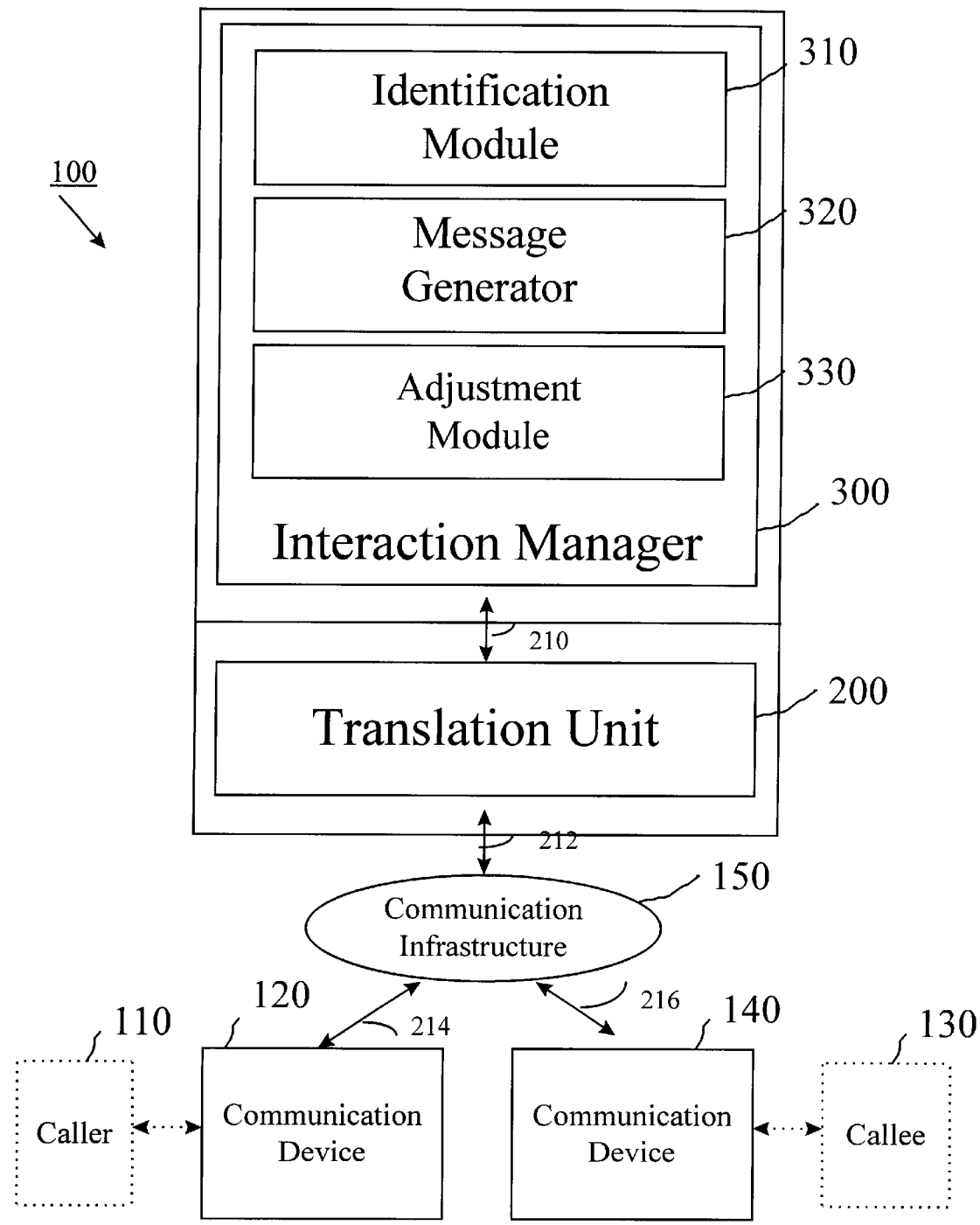
FIG. 1 is a block diagram of one exemplary embodiment of a system that manages electronic communications in accordance with this invention.

FIG. 1 is a block diagram of one exemplary embodiment of a system 100 that manages electronic communications. The electronic communications system 100 includes an interaction manager 300 connected to a translation unit 200 through a first data link 210, a communication infrastructure 150 connected to the translation unit 200 through a second data link 212, a first party communication device 120 connected to the communication infrastructure 150 through a third data link 214, and a second party communication device 140 connected to the communication infrastructure 150 through a fourth data link 216.

The communication infrastructure 150 can accommodate communication between the first party communication device 120 and the second party communication device 140 by providing a communication path capable of transmitting and receiving communication signals between the links 214 and 216. The communication infrastructure 150 can include any known or later developed network for transmitting information. Such networks can include any combination of wide area networks, local area networks, public switched telephone networks, wireless or wired networks, intranets, the Internet or any other distributed processing network or system. In general, the communication infrastructure 150 can be any known or later developed combination of systems, computer programs or structures useable to transmit and receive information over the links 212, 214 and 216.

The links 212, 214 and 216 can be any known or later developed device or system for transmitting data between the translation unit 200, the first party communication device 120, the second party communication device 140 and/or the communication infrastructure 150. Such devices include direct serial/parallel cable connections, satellite links, wireless links, connections over a wide area network or a local area network, connections over a public switched telephone system, connections over an intranet, connections over the Internet or connections over any other distributed processing network or system. Additionally, the links 212, 214 and 216 can be software devices linking various software systems. In general, the links 212, 214 and 216 can be any known or later developed devices or systems, computer programs or structures useable to connect the translation unit 200 and the communication devices 120 and/or 140 to the communications infrastructure 150.

In various exemplary embodiments, each of the communication devices 120 and 140 can be a Web-enabled telephone (a webphone), a cellular telephone, a standard telephone, a personal digital assistant (PDA), a two-way pager, a facsimile machine or program, or a network-attached personal computer.

In various exemplary embodiments, the translation unit 200 is able to facilitate communication with the interaction manager 300 using any of one or more provided communication protocols. For each such communications protocol, the translation unit 200 converts a communication request received from the communication device 120 or 140 to the proper format for the interaction manager 300. In addition, the translation unit 200 can provide parameter information to the interaction manager 300 indicating the communication mode of the caller 110.

Figure 2:
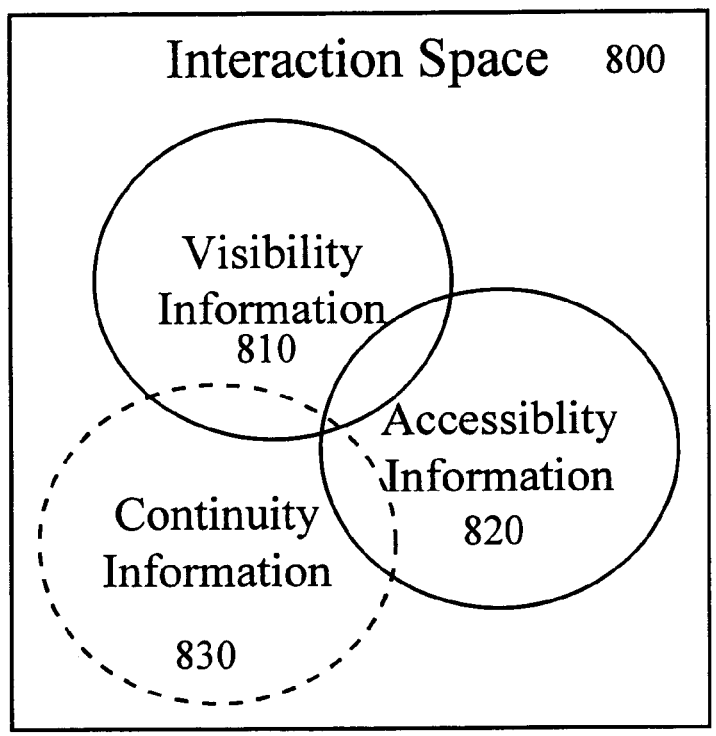
FIG. 2 is an exemplary diagram of an interaction space.

The interaction manager 300 provides the caller 110 with a response message. In most cases, this response message will be implemented as an interaction space. FIG. 2 shows one exemplary embodiment of an interaction space according to this invention.

The interaction manager 300 can be capable of providing the caller 110 with a set of one or more communication channels usable to interact with the callee 130, along with information about the current status of the callee 130. The caller 110 can then make an informed choice regarding which provided communication channel to use to contact the callee, based on the interpretation by the caller 110 of the status of the callee 130. The list of communication channels can include hypertext links, for example, pointing to addresses of these devices or to locations capable of directing communication to these devices.

The interaction manager 300 is able to generate one or more personalized interaction spaces 800 as shown in FIG. 2. A single interaction space 800 reflects the relationship between the caller 130, who is the owner of the interaction space 800, and the callee 110 who uses the interaction space 800. In various exemplary embodiments of the systems and methods according to this invention, the interaction manager 300 is implemented as a distributed system having software components residing on a web server of the callee 130. These software components interact with other individuals, or with other interaction managers that reside on a web server of the caller 110.

In various other exemplary embodiments, the interaction manager 300 is implemented as hardware and/or software included in first party communication device 120 and/or the second party communication device 140.

In various exemplary embodiments, the interaction manager 300 is provided and hosted by a third party service provider. In these exemplary embodiments, the interaction manager 300 can be made available to the callee 130 as a service. In this case, the third party service provider hosts the interaction manager 300 on various computer devices and systems. Furthermore, the third party service provider can charge a fee for the service. Moreover, the callee 130 may be able to access the service provider's interaction manager 300 through one or more communication channels.

Generally, the caller 110, who is associated with the caller's communication device 120, can interact with or obtain interaction information about the callee 130. For example, the first party 110 can connect with the callee's interaction manager 300 using a web-enabled telephone. In this case, the communication infrastructure 150 can include the Internet. When the caller 110 calls, the callee 130 might be tied up in an important meeting. In this situation, the interaction manager 300 can provide callee-specific information to the caller 110 regarding the current status of the callee 130. Such personalized information can include, for example, a recorded message to the effect that the callee 130 is currently in a meeting. Furthermore, the first party communication device 120 can display a hyperlink to the callee's scheduler. The caller 110 can then determine an appropriate course of action to take.

As shown in FIG. 1, in various exemplary embodiments, the interaction manager 300 includes one or more of an identification module 310, a message generator 320, and an adjustment module 330. In operation, the identification module 310 can determine the identity of the caller 110 based on an identifier. The identifier can be obtained, for example, by examining the contents of a cookie file associated with the caller 110, using an electronic mail (e-mail) address associated with the caller 110, using Automatic Number Identification (ANI), or using a biometric device (e.g., a voice recognition device or an iris scan device). Once the identifier for the caller 110 has been determined by the identification module 310, a personalized response message can be tailored by the message generator 320. Such a message can inform the caller 110, for example, about the status of the callee 130. Furthermore, the adjustment module 330 allows the callee 130 to make data available to generate the response message.

FIG. 2 is a block diagram graphically illustrating one exemplary embodiment of the interaction space 800 according to this invention. As shown in FIG. 2, the interaction space 800 includes visibility information 810, accessibility information 820, and continuity information 830. The visibility information 810 informs the caller 110 about the status or situation of the callee 130. The accessibility information 820 provides the caller 110 with a list of communication channels that the callee 130 has decided to make available to the caller 110. The continuity information 830, for example, can contain information and action facilitation data that reflect the ongoing interaction between that caller 110 and the callee 130. However, it should be appreciated that the interaction space 800 does not necessarily need to include the continuity information 830. The interaction space 800 is presented to the caller 110 in a modality that is suited to the particular communication device 140 being used by the caller 110.

In various exemplary embodiments, the interaction space 800 is generated by integrating the visibility information 810, the accessibility information 820, and the continuity information 830.

The visibility information 810 can be determined using data regarding the relation between the caller 130 and the callee 110 and the current status of the callee 110. Status data can include vectors of location, activity, and social context information, for example. The location, activity, and social context information can be obtained from various sources, for example, from explicit input from the callee 130, from sensor data obtained from sensor in the callee's environment, from schedule information and interaction history, and from various functions (for example, a function that determines who might be located near the callee 130 from knowledge about the callee's 130 current location and relation information). It should be appreciated that this status data can be frequently updated and can be stored in various databases or other memory devices.

In various exemplary embodiments, the visibility information 810 is generated in two steps. First, a greeting message that acknowledges the relation between a particular caller 130 and the callee 110 can be created, for example, by selection of an appropriate greeting template. Then, an informative message about the callee's 110 current situation can be determined, for example, using the callee's 110 status data, filtered through selection criteria defined for the particular relation between the particular caller 110 and the callee 130.

The accessibility information 820 can be determined from data about the relation between the particular caller 130 and the callee 110, the current status data of the callee 110 and the communication channels available to the callee 110. For example, the accessibility information 820 can be generated as a list of communication channels to be used by the particular caller 110. However, the set of channels can be narrowed based on the status data of the callee 130. In various exemplary embodiments, all channels that are available to a particular caller 130 may be displayed to the caller 130 even though some might be inappropriate in the current situation. That is, the caller 130, rather than the interaction manager 300, is given the responsibility to make an appropriate choice.

The continuity information 830 can be determined from data about the relation between the particular caller 110 and the callee 130, the current status data of the callee 130 and various extracts of data from the shared activities between the caller 110 and the callee 130, including historical information in the form of prior interactions between the caller 110 and the callee 130 and scheduled future interactions, for example, as contained in electronic scheduling or calendar systems.

Figure 3:
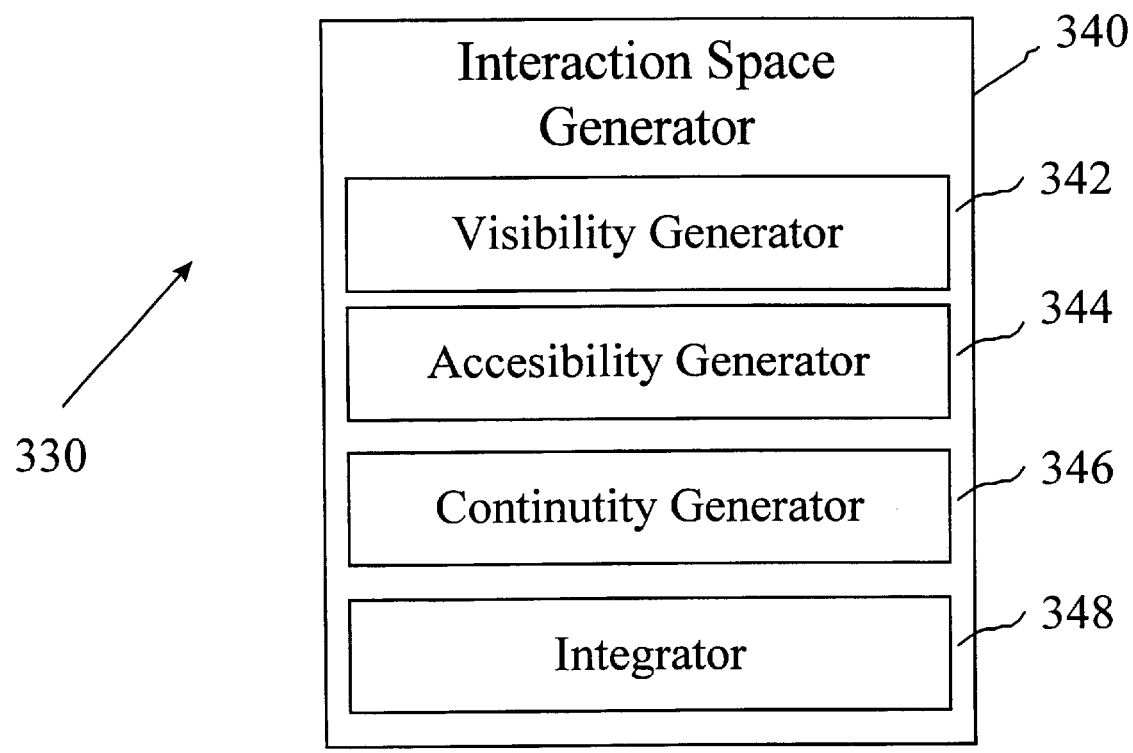
FIG. 3 is a block diagram of one exemplary embodiment of the message generator shown in FIG. 1.

FIG. 3 is a block diagram showing in greater detail one exemplary embodiment of the message generator 320 shown in FIG. 1. The message generator 320 includes an interaction space generator 340. The interaction space generator 340 includes a visibility generator 342, an accessibility generator 344, a continuity generator 346, and an integrator 348.

In operation, the message generator 320 can generate an initial response message to the caller 110. Initially, the interaction space 800 is provided to the caller 110 to facilitate the contact of the caller 110 with the callee 130. The interaction space 800 combines personalized information about the callee 130 and the current status of the callee 130, along with interaction options for the particular caller 110, such as a list of available communication channels. The interaction space 800 can be presented to the caller 110, for example, as an HTML page in a conventional web browser, on a mini-browser associated with a webphone, for example, by using an interaction card, such as, for instance, a WML card or as an interaction sound bite, such as, for example, as a structured audio recording on a voice mail system.

It should be appreciated that the particular format in which the interaction space 800 is presented may vary depending on the capability of the communication device 120 of the caller 110. For example, a lengthy text message may not be suitable for a mini-browser associated with a webphone though it might be acceptable for an HTML page in a conventional web browser. Likewise, a message in text format would not be suitable for a standard telephone that does not have a display screen. However, in various exemplary embodiments, this information can be presented to the caller's communication device in audio format using a text-to-speech interface.

In various exemplary embodiments, the interaction space generator 340 can create the three aspects of the interaction space 800, namely, the visibility information portion 810, the accessibility information portion 820 and the continuity information portion 830. Furthermore, the interaction space generator 340 can integrate these aspects of the interaction space 800 using the integrator 348.

FIGS. 4 and 5 show two exemplary devices capable of displaying the interaction space 800 to the caller 110 or to the callee 130. Although each communication device is capable of displaying the interaction space 800 to any caller 110, or to the callee 130, the actual content of the interaction space 800 may differ depending on the identity of a particular caller 110. For example, as shown in FIG. 4, the interaction space 800 displayed on the first communication device 301 includes a general message that the callee 130 can provide to any caller 110. However, as shown in FIG. 5, the interaction space 800 displayed on the second communication device 302 includes an interaction space 800 that is specifically tailored to a particular caller 110, and provides a greater degree of detail and specificity. Because the interaction space 800 displayed on the second communication device 302 can be customized for a particular caller 110, the interaction space 800 displayed on the second communication device 302 can enhance the interaction between that caller 110 and the callee 130.

In operation, the content of a response message is generated as a result of a multi-step process. First, the identity of a current caller 110 is determined based on an identifier associated with that caller. Once the identifier of the current caller 110 is obtained, a set of basic selection criteria associated with that particular caller 110, or a default set if the current caller 110 is not known to the callee 130, can be retrieved.

In various exemplary embodiments, the visibility information 810 of the interaction space 800 can include, for example, information from the callee 130 to the caller 110. In various exemplary embodiments, the information can be based on a template specified for an entire category of callers 110. Furthermore, the visibility information 810 of the interaction space 800 can include, for example, a message which communicates something about the current status of the callee 130, thus assisting the caller 110 in determining an appropriate method of interaction with the callee 130. In general, this information about the callee 130 can be any information the callee 130 wants to present to one or more potential callers 110. For example, the name of the callee 130 can be adjusted for the particular relationship between a particular caller 10 and the callee 130. For example, a greeting such as "Dr. Smith" may be appropriate in a situation in which the caller 110 is a patient and the callee 130 is a physician. Furthermore, the information can be a specialized message, such as, for example, a message to a friend or business associate. In various exemplary embodiments, the information can be entered for a particular caller 110 such that the appropriate information can be displayed.

In various exemplary embodiments, the continuity generator 346 can generate a facilitating section of the interaction space 800 displayed in the display area of the communication device 302 informing the caller 110 that the callee 130 has left a message. Furthermore, in various exemplary embodiments, the continuity generator 346 can attempt to ascertain what a call may be about. For example, if there is an upcoming calendar entry concerning a particular caller 110, the continuity generator 346 might determine that a call from that caller 110 concerns this appointment. If the entry in the scheduler is "meeting," the message options could be, for example, "postponed," "confirm," or "cancel."

In various exemplary embodiments, the interaction space 800 can include links to available communication channels a particular caller 110 can access. For example, these available communication channels can be grouped into or represented entirely as logical interaction channels based on the situation and needs of a particular caller. However, the set of communication channels available to a caller 110 may depend on the status of the callee 130. For example, the callee 130 may not allow any direct calls when the callee 130 is in a meeting.

Figure 6:
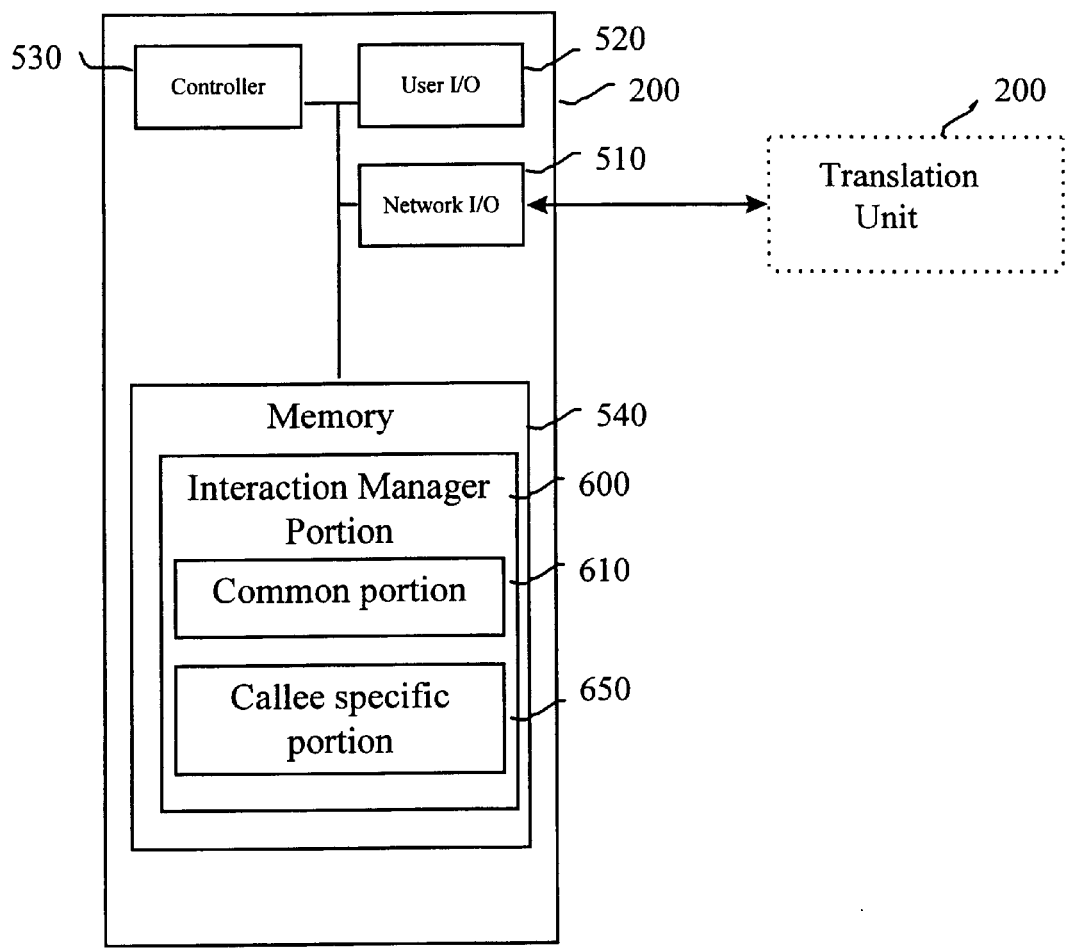
FIG. 6 is a block diagram of one exemplary embodiment of the interaction manager shown in FIG. 1.

FIG. 6 is a block diagram of one exemplary embodiment of an interaction manager system 500. As shown in FIG. 6, the interaction manager system 500 includes a user input/output (I/O) 520, an network input/output (I/O) 510, a controller 530, and memory 540. The memory 540 includes an interaction manager portion 600, a common data portion 610, and a callee specific data portion 650. The interaction manager system 500 is linked to the translation unit 200. The user I/O 520, the network I/O 510, the controller 530, and the memory 540 can be linked to each other and/or to other devices by a data/control bus 501. The interaction manager system 500 includes software, firmware and/or hardware sufficient to implement the interaction manager 300 and its various components, such as, for example, the exemplary components illustrated in FIGS. 1 and 3. This software, firmware and /or hardware can be implemented on the controller and/or stored in a portion of the memory 540, such as, but not limited to, or even necessarily, the common portion 610.

In a first mode of operation, the controller 530 receives an interaction request via the network I/O 510. This request includes a caller identifier. For example, the controller 530 can receive a signal via the network I/O 510 containing information extracted from a cookie file associated with a particular caller 110. Once the controller 530 has received the interaction request, the controller 530 can retrieve the appropriate information regarding the caller 110 and/or the callee 130 from the memory 540 and generate an appropriate interaction space 800.

The memory 540 can include the common data 610 including a list of known IDs that contain an index of known identifiers for potential callers 110 and shared activity data which can be a proxy for each of two shared activity databases. Such shared activity can include activity which the caller 110 and the callee 130 have had or will have in common such as, for example, interactions (calls, e-mails, messages) and meetings (both past and scheduled). The common data portion 610 can include an interaction history that contains a history of the interactions involving the callee 130 and the particular caller 110 and an interaction schedule that can contain any scheduled interactions. Furthermore, the memory 540 can include the callee specific data portion 650, including settings data, relation data which describes the relationships and associated selection criteria to which each of the callers 110 identified from examination of the common data belong, the unique identifier of the callee 130, the available communication channels and callee status data regarding the dynamically changing information about the callee 130 such as, for example, the current location, activity and/or social context of the callee 130. In general, the information contained in the memory 540 can include sufficient information for the controller 530 to create a personalized interaction space 800 for a particular caller 110.

Once the controller 530 has identified the caller 110 and retrieved the appropriate information from the memory 540 for this caller 110, the controller 530 can then generate an appropriate interaction space 800 for this caller 110. For example, the information retrieved from the common data 600 might reveal that the caller 110 is a close friend of the callee 130 and is, therefore, entitled to more urgency than, for example, when the caller 110 is a telemarketer. Furthermore, the callee specific data portion 650 might reveal that the callee is currently located at his or her office and in a meeting. This meeting might be determined to be of very high importance given the social context involved. For example, the callee's 130 scheduler might indicate that there are several senior executives attending this meeting and it is taking place in the Board Room. Given this social context, it might be determined that this meeting is of high priority.

In this example, although the callee 130 might have displayed visibility information to a telemarketer simply indicating the unavailability of the callee 130 without any accessibility information, the callee 130 can tailor specific visibility information to the caller 110 who is a friend, indicating that the callee 130 is in a meeting, along with a hypertext link to the schedule of the callee 130. The accessibility information presented to the friend caller 110 might include the pager number of the callee 130, for example. In this instance, the pager number would appear in the list of communication channels displayed to the friend caller 110. The friend caller 110 might decide to direct a message to the pager of the callee 130 notwithstanding the importance of the meeting. In contrast, a telemarketer caller would not be given this information.

Figure 7:
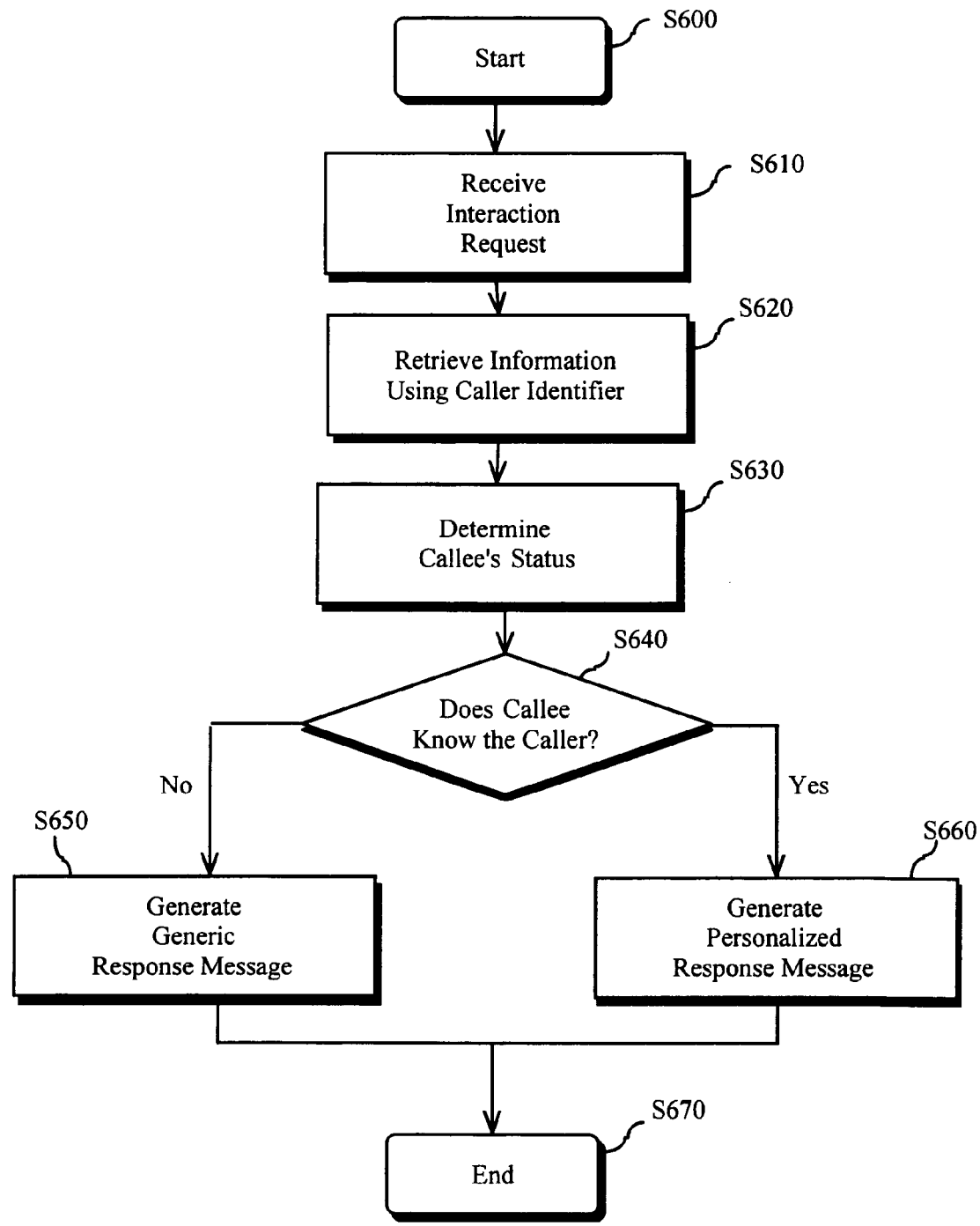
FIG. 7 depicts a flow chart outlining an exemplary technique for facilitating interaction.

FIG. 7 depicts a flowchart outlining one exemplary embodiment of a technique for facilitating interaction. Beginning at step S600, control continues to step S610, where an interaction request is received by the callee's interaction manager. The interaction request may include information relating to the caller's identity, communication device and mode of communication. In this exemplary embodiment, a caller may contact the callee's interaction manager using a Web-enabled telephone (webphone) and the callee's interaction manager can be resident on an hypertext transfer protocol (HTTP) server. Next, in step S620, the interaction request is examined for a caller identifier. For example, the interaction request may include identification information extracted from a cookie file associated with the caller's webphone. Then, in step S630, the callee's interaction manager determines the callee's status. The callee's status can be determined in various ways using numerous sources of information. For example, the callee's status may be determined using information derived from an electronic schedulers/calendar system, data explicitly input by the callee, sensor information, location information, and social context information. Control then continues to step S640.

In step S640, a determination is made whether the caller is known to the callee. This can be determined by examining a list of known caller ID's, for example. If the caller identifier does not match information stored in these lists of known caller ID's, it may be determined that the caller and the callee do not know each other. Regardless of how the relationship is determined, based on the determined relationship one of any number of different message types that reflect the determined relationship, can be generated. In the exemplary embodiment shown in FIG. 7, to avoid overly complicating the disclosure, only two message types are available, a generic message and a more personalized message. Thus, in step S640, if the caller 110 is determined to have some type of a personal relationship with the caller 130, control continues to step S660. Otherwise, control jumps to step S650.

In step 650, the generic response message can include an interaction space with generalized visibility information and a limited range of accessibility information. In contrast, in step S660, a personalized response message is generated. This personalized response message can include an interaction space with visibility information containing information regarding the callee's status, for example.

The visibility information presented to a caller can vary depending on the relation between the caller and the callee and the callee's status. In addition, this personalized interaction space may include accessibility information tailored to the particular caller and may take into consideration the callee's status. This accessibility information may include, for example, hypertext links to a plurality of channels available for the caller to connect with the callee. Optionally, the personalized interaction space may include continuity information that includes information related to the ongoing interaction between the caller and the callee. It should be appreciated that any response message that is generated by the caller's communication device will depend on whether the caller's communication device is capable of utilizing a particular mode of communication. The interaction manager can examine parameter information to determine a suitable mode of communication between the caller and the callee.

After the response message has been generated in either step S650 or step S660, control continues to step S670, where the operation stops.

Various exemplary embodiments of the systems and methods of this invention can be implemented using a general purpose computer system. However, the systems and methods of this invention can be implemented using any combination of one or more programmed general purpose computers, programmed microprocessors or microcontrollers and peripheral integrated circuit elements, ASIC or other integrated circuits, digital signal processors, hardwired electronic or logic circuits such as discrete element circuits, programmable logic devices such as a PLD, PLA, FPGA or PAL, or the like. In general, any device capable of implementing a finite state machine that is in turn capable of implementing the flowchart shown in FIG. 7 and/or the interaction manager shown in FIGS. 1 and/or 3, can be used to implement the systems and methods of this invention.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of facilitating interaction between a caller and a callee, comprising:
    receiving an interaction request;
    obtaining a caller identifier of the caller from the received interaction request;
    retrieving information from at least one data source using the caller identifier;
    determining information data usable to generate a response message for the caller based on the information and data specific to the callee, the data specific to the callee including status data of the callee that is extracted, in response to the interaction request, from a plurality of information sources, the information sources each containing an aspect of a status of the callee; and
    generating the response message based on the determined information data.

2. The method of claim 1, wherein obtaining the caller identifier comprises obtaining the caller identifier based on at least one of Automatic Number Identification (ANI), cookie information, and biometric information.

3. The method of claim 1, wherein the response message includes visibility information.

4. The method of claim 1, wherein the response message includes accessibility information.

5. The method of claim 4, wherein the accessibility information includes at least one communication channel associated with the callee.

6. The method of claim 5, wherein generating the response message comprises providing the at least one communication channel as a hypertext link.

7. A method of facilitating interaction between a caller and a callee, comprising:
    receiving an interaction request;
    obtaining a caller identifier of the caller from the received interaction request;
    retrieving information from at least one data source using the caller identifier; and
    generating a response message for the caller based on the information and data specific to the callee, wherein the response message includes continuity information, the continuity information including information extracted, in response to the interaction request, from shared activities between the caller and the callee.

8. The method of claim 1, wherein the data specific to the callee includes callee status data.

9. The method of claim 8, wherein the callee status data includes at least some of activity data, location data, and social context data.

10. The method of claim 9, further comprising determining the location data at least in part from scheduling data.

11. The method of claim 9, further comprising determining the social context data at least in part from scheduling data.

12. The method of claim 8, further comprising determining the callee status data at least in part from signals generated by sensors.

13. The method of claim 1, wherein the caller and the callee are human.

14. A system that facilitates interaction between a caller and a callee, comprising:

an input interface that receives an interaction request;

an identification module that obtains a caller identifier of the caller from the received interaction request and retrieves information from at least one data source using the caller identifier; and a message generator that determines information data usable to generate a response message for the caller based on the information and data specific to the callee and that generates the response message based on the determined information data, the data specific to the callee including status data of the callee that is extracted, in response to the interaction request, from a plurality of information sources, the information sources each containing an aspect of a status of the callee.

15. The system of claim 14, wherein the identification module obtains the caller identifier based on at least one of Automatic Number Identification (ANI), cookie information, and biometric information.

16. The system of claim 14, wherein the response message includes visibility information.

17. The system of claim 14, wherein the response message includes accessibility information.

18. The system of claim 17, wherein the accessibility information includes at least one communication channel associated with the callee.

19. The system of claim 18, wherein the response message includes at least one communication channel as a hypertext link.

20. A system that facilitates interaction between a caller and a callee, comprising:

an input interface that receives an interaction request;

an identification module that obtains a caller identifier of the caller from the received interaction request and retrieves information from at least one data source using the caller identifier; and a message generator that generates a response message for the caller based on the information and data specific to the callee, wherein the response message includes continuity information, the continuity information including information extracted, in response to the interaction request, from shared activities between the caller and the callee.

21. The system of claim 14, wherein the callee specific data includes callee status data.

22. The system of claim 21, wherein the callee status data includes at least some of activity data, location data, and social context data.

23. The system of claim 22, wherein the message generator determines the location data at least in part from scheduling data.

24. The system of claim 22, wherein the message generator determines the social context data at least in part from scheduling data.

25. The system of claim 21, wherein the message generator determines the callee status data at least in part from signals generated by sensors.

26. The system of claim 14, wherein the caller and the callee are human.

27. The system of claim 14, wherein the system is hosted by a third party service provider.

28. A method of facilitating interaction between a caller and a callee, comprising:

receiving an interaction request;

obtaining a caller identifier of the caller from the received interaction request;

retrieving caller information using the caller identifier;

extracting callee information from a plurality of callee information sources, based on the retrieved caller information; and generating a response message for the caller based on information and data specific to the callee, the data specific to the callee including status data, wherein the response message includes continuity information extracted from shared activities between the caller and the callee.

\* \* \* \* \*